(12) United States Patent
Lv et al.

(10) Patent No.: US 10,947,068 B2
(45) Date of Patent: Mar. 16, 2021

(54) TELESCOPIC PLATE

(71) Applicant: SHENZHEN FULONG INTELLIGENT TECHNOLOGY DEVELOPMENT CO., LTD., Shenzhen (CN)

(72) Inventors: Fulai Lv, Shenzhen (CN); Wenlong Lv, Shenzhen (CN)

(73) Assignee: SHENZHEN FULONG INTELLIGENT TECHNOLOGY DEVELOPMENT CO., LTD., Shenzhen (CN)

(*) Notice: Subject to any disclaimer, the term of this patent is extended or adjusted under 35 U.S.C. 154(b) by 0 days.

(21) Appl. No.: 16/966,491

(22) PCT Filed: Mar. 21, 2019

(86) PCT No.: PCT/CN2019/078984
§ 371 (c)(1),
(2) Date: Jul. 31, 2020

(87) PCT Pub. No.: WO2019/210748
PCT Pub. Date: Nov. 7, 2019

(65) Prior Publication Data
US 2021/0010679 A1    Jan. 14, 2021

(30) Foreign Application Priority Data
May 4, 2018 (CN) .......................... 201810417809.2

(51) Int. Cl.
*B65G 69/28* (2006.01)
*A47B 88/487* (2017.01)
(Continued)

(52) U.S. Cl.
CPC ............ *B65G 69/28* (2013.01); *A47B 88/487* (2017.01); *A61G 3/061* (2013.01); *B60P 1/433* (2013.01); *B61D 23/00* (2013.01); *B65G 69/30* (2013.01)

(58) Field of Classification Search
CPC ...... B65G 69/28; B65G 69/30; A47B 88/487; B61D 23/00; A61G 3/061; B60P 1/433
(Continued)

(56) References Cited

U.S. PATENT DOCUMENTS

| 7,228,582 B1 * | 6/2007 | Jones ..................... B63B 27/143 14/69.5 |
| 7,488,025 B1 * | 2/2009 | Roberson ................ B60P 1/433 296/61 |

(Continued)

FOREIGN PATENT DOCUMENTS

| CN | 206202306 U | 5/2017 | |
| EP | 1541107 | * 6/2005 | ............... A61G 3/06 |

OTHER PUBLICATIONS

International Search Report issued in corresponding International application No. PCT/CN2019/078984, dated Jul. 3, 2019.
(Continued)

*Primary Examiner* — James O Hansen

(57) ABSTRACT

A telescopic plate includes a sliding rail structure (10), a rotation structure (20), a drive structure (30) including a motor (31), a circulation structure (40) including an upper connection member (41) and a lower connection member (42), and a support frame (50) mounted on the telescopic sliding rail. The sliding rail structure includes a fixed sliding rail (11) and a telescopic sliding rail (12); the rotation structure including a double-groove wheel (21) mounted at one end of the motor; the upper and lower connection members are wound on the double-groove wheel and extend into the fixed sliding rail to fix with the telescopic sliding (Continued)

rail; a positioning bolt (111) is provided on an inner wall at the tail end of the fixed sliding rail; a positioning groove (1211) is provided at the front end of the telescopic sliding rail; the upper and lower connection members pull the telescopic sliding rail to implement sliding of the support frame in the fixed sliding rail; the positioning bolt and the positioning groove are cooperative so that the telescopic sliding rail rotates around the positioning bolt. A motor is used for controlling to slide and rotate the support frame; a rotation angle can be adjusted by means of a remote-control operation so as to meet user requirements.

8 Claims, 5 Drawing Sheets

(51) Int. Cl.
*A61G 3/06* (2006.01)
*B60P 1/43* (2006.01)
*B61D 23/00* (2006.01)
*B65G 69/30* (2006.01)

(58) Field of Classification Search
USPC .................. 312/294; 414/537; 14/69.5, 71.1
See application file for complete search history.

(56) References Cited

U.S. PATENT DOCUMENTS

| 2006/0245883 | A1* | 11/2006 | Fontaine | B60P 1/431 414/537 |
| 2006/0288501 | A1* | 12/2006 | Thygesen | B60P 1/43 14/69.5 |
| 2009/0108614 | A1* | 4/2009 | Washington | B60P 1/435 296/61 |
| 2010/0043664 | A1* | 2/2010 | Winkelmann | B61D 23/00 104/31 |
| 2011/0008140 | A1* | 1/2011 | Hansen | A61G 3/067 414/523 |
| 2013/0340647 | A1* | 12/2013 | Klamka | B61D 23/00 105/436 |
| 2014/0147237 | A1* | 5/2014 | Rasekhi | A61G 3/061 414/537 |
| 2015/0052693 | A1* | 2/2015 | Allen | A61G 3/061 14/71.1 |
| 2016/0152170 | A1* | 6/2016 | Kiyak | B65G 69/28 414/522 |
| 2017/0327022 | A1* | 11/2017 | Rasekhi | B60R 3/02 |

OTHER PUBLICATIONS

Written Opinion of the International Searching Authority for No. PCT/CN2019/078984, dated Jul. 3, 2019.
Initial Publication for PCT/CN2019/078984.

* cited by examiner

TELESCOPIC PLATE

BACKGROUND

1. Technical Field

The present disclosure especially relates to a telescopic plate.

2. Description of Related Art

A telescopic plate is a common mechanical structure, which is mainly used to hide a plate-type structure and extend it out when it's needed to be used and belongs to a space-saving structure. Such telescopic plate is mainly used in automobile retractable pedals, transport vehicle transition plates, building tooling and home decoration. However, a conventional telescopic plate used in the current market has problems of a single function and a too-small-range rotation angle without being adjusted, which can't meet the needs of users.

SUMMARY

The technical problems to be solved: in view of the shortcomings of the related art, the present disclosure provides to a telescopic plate which can telescopically rotate and easily adjust a rotation angle to meet user's requirements.

The technical solution adopted for solving technical problems of the present disclosure is:

a telescopic plate according to an embodiment of the present disclosure includes: a sliding rail structure including at least one fixed sliding rail and at least one telescopic sliding rail sliding within the fixed sliding rail; a drive structure including at least one motor; a rotation structure including at least one double-groove wheel mounted on an end of the motor; a circulation structure including an upper connection member and a lower connection member, the upper connection member and the lower connection member wound around the at least one double-groove wheel and extending into the fixed sliding rail to be fixedly connected with the telescopic sliding rail; a support frame mounted on the telescopic sliding rail; a positioning bolt formed on an inner wall at a tail end of the fixed sliding rail and a positioning groove formed at a front portion of the telescopic sliding rail to engage with the positioning bolt; and wherein the upper connection member and the lower connection member are provided for pulling the telescopic sliding rail to drive the support frame to slide in the fixed sliding rail; and the positioning bolt and the positioning groove are cooperatively engaged with each other so that the telescopic sliding rail can rotate relative to the positioning bolt so as to slide and rotate the support frame relative to the fixed sliding rail.

Wherein a rotation angle of the telescopic sliding rail rotating around the positioning bolt is formed 0-100°.

Wherein the circulation structure further includes a guiding wheel fixed at a distal top end of fixed sliding rail, a swing arm and a sliding wheel fixedly connected with the telescopic sliding rail via the swing arm, the upper connection member passing through the guiding wheel and the sliding wheel in turn and then fixed with the telescopic sliding rail, and the lower connection member passing through the sliding wheel and then fixed with the telescopic sliding rail.

Wherein the telescopic sliding rail includes a sliding portion, a connecting portion and a mounting portion all integrated with together, the sliding portion sliding at a mouth end of the fixed sliding rail, the mounting portion exposed outwardly and installed on the support frame, and the connecting portion including a through-hole formed at a front portion thereof to movably hinge with the swinging arm.

Wherein the fixed sliding rail further includes a square hole provided that the front portion of the telescopic sliding rail can pass therethrough during rotation of the telescopic sliding rail, a baffle provided for resisting against the swinging arm during indented rotation of the telescopic sliding rail, and a via-hole connected with the square hole and receiving the guiding wheel therein, the upper connection member passing through the via-hole and the guiding wheel and then entering into the fixed sliding rail.

Wherein the telescopic plate further includes at least one pair of fixing structures fixed with the fixed sliding rail, one of the pair of fixing structures fixed at a front-top end of the fixed sliding rail, the other of the pair of fixing structures fixed at the distal top end of the fixed sliding rail and coaxial with the via-hole, the guiding wheel passing through the via-hole and fixed at a lower end of the fixing structure.

Wherein the amount of each of the double-groove wheel, the fixed sliding rail and the telescopic sliding rail is one, and the amount of the motor is two, the support frame movably connected with the telescopic sliding rail via an arc support which is fixedly connected with the motor, the motor fixedly mounted on the mounting portion to drive the arc support to rotate around the telescopic sliding rail so that the support frame is driven to rotate around the telescopic sliding rail.

Wherein a rotation angle of the support frame rotating around the telescopic sliding rail is formed 0-360°.

Wherein the amount of each of the double-groove wheel, the fixed sliding rail and the telescopic sliding rail is two, and the amount of the motor is one, the two double-groove wheels installed on two ends of the motor, an extending direction of the two fixed sliding rails same and parallel to an extending direction of the two telescopic sliding rails, the support frame fixedly mounted on the two telescopic sliding rails.

Wherein the support frame includes a supporting plate, an anti-skidding plate and a lining plate formed between the supporting plate and the anti-skidding plate.

The present disclosure provides the advantages as below.

The present disclosure can telescopically rotate by controlling the support frame via the motor and adjust a rotation angle by a remote operation to meet the needs of users, and can conveniently be used with a simple structure and a large adjustable range of the rotation angle.

Figure 1:
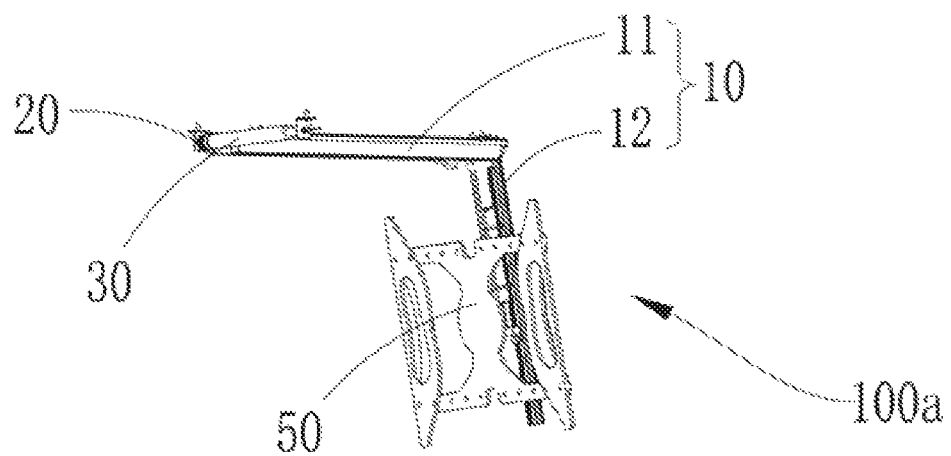
FIG. 1 is a schematic view of a telescopic plate in accordance with a first embodiment of the present disclosure.

The element labels according to the embodiment of the present disclosure shown as below:

telescopic plate 100a, 100b, sliding rail structure 10, fixed sliding rail 11, distal top end 11a, distal inner wall 11b, mouth end 11c, front-top end 11d, positioning bolt 111, square hole 112, baffle 113, via-hole 114, flipping member 115, telescopic sliding rail 12, front portion 12a, sliding portion 121, positioning groove 1211, through-hole 1212, connecting portion 122, front end 122a, first idler wheel 1221, mounting portion 123, rotation structure 20, double-groove wheel 21, drive structure 30, motor 31, an end 31a, driving sleeve tube 311, hollow shafting tube 312, wire 313, holder 32, circulation structure 40, upper connection member 41, lower connection member 42, guiding wheel 43, sliding wheel 44, swing arm 45, support frame 50, supporting plate 51, lining plate 52, anti-skidding plate 53, second idler wheel 54, fixing structure 60, lower end 60a, arc support 70, slotted hole 71, post 72, hinge 73, thrust bearing 74, spiral hose 80.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In the description of the present disclosure, it needs to be explained that all the directional indicators as the terms; "upper", "below", "left", "right", "front", "back" . . . ), are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

In the description of the present disclosure, except where specifically otherwise illustrated or limited, the terms "connect" and "link" used herein should be understood in a broad sense. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Furthermore, in the description of the present disclosure, the terms such as "first" and "second" shown in the specification are only used to describe, but not indicated that the elements of the present disclosure is important or represented the amount of the elements. That is, the features limited by the terms of "first" and "second" may explicitly or implicitly include one or more features.

Referring to FIGS. 1-9, a telescopic plate 100a, 100b according to an embodiment of the present disclosure includes a sliding rail structure 10, a rotation structure 20, a drive structure 30, a circulation structure 40, and a support frame 50. The sliding rail structure 10 includes at least one fixed sliding rail 11 and at least on telescopic sliding rail 12 sliding within the fixed sliding rail 11. The drive structure 30 includes at least one motor 31 and the rotation structure 20 includes at least one double-groove wheel 21 mounted at one end 31a of the motor 31. The circulation structure 40 includes an upper connection member 41 and a lower connection member 42, both the upper connection member 41 and the lower connection member 42 are wound on the double-groove wheel 21 and extended into the fixed sliding rail 11 to be fixed with the telescopic sliding rail 12. The support frame 50 is mounted on the telescopic sliding rail 12. A positioning bolt 111 is formed on an inner wall 11b at the tail end of the fixed sliding rail 11. A positioning groove 1211 is provided at a front end 12a of the telescopic sliding rail 12. The upper connection member 41 and the lower connection member 42 are provided for pulling the telescopic sliding rail 12 so that the support frame 50 can slide in the fixed sliding rail 11; and the positioning bolt 111 and the positioning groove 1211 are cooperatively engaged with each other so that the telescopic sliding rail 12 can rotate relative to the positioning bolt 111 so as to slide and rotate the support frame 50 relative to the fixed sliding rail 11.

When the telescopic plate 100a, 100b is non-used, the telescopic sliding rail 12 is parallelly installed on the fixed sliding rail 11 to save a space therebetween. When the telescopic plate 100a, 100b is needed, the motor 31 can be controlled to work by a remote control, so as to control the double-groove wheel 21 to rotate along a first direction, so that the upper connection member 41 wound around the double-groove wheel 21 can pull the telescopic sliding rail 12 to slide out of the fixed sliding rail 11 and then stop a linear movement when the telescopic sliding rail 12 reaches a distal end of the fixed sliding rail 11. As the upper connection member 41 continues to pull the telescopic sliding rail 12 and under an action of gravity of the telescopic sliding rail 12 and the support frame 50, the positioning bolt 111 and the positioning groove 1211 are cooperated to make the telescopic sliding rail 12 rotate around the positioning bolt 111, thus driving the support frame 50 to extend and rotate outwardly. When the telescopic plate 100a, 100b are finished to be used, the motor 31 can be controlled by the remote control to drive the double-groove wheel 21 to rotate along a second direction, so that the lower connection member 42 wound around the double-groove wheel 21 can pull the telescopic sliding rail 12 to slide inside the fixed sliding rail 11, thus driving the support frame 50 to retractably move back to its original position. Furthermore, the first direction is opposite to the second direction, for example, the first direction is clockwise and the second direction is counterclockwise.

The telescopic plate 100a, 100b of the present disclosure can telescopically rotate by controlling the support frame 50 via the motor 31 and adjust a rotation angle by a remote operation to meet the needs of users, and can conveniently be used with a simple structure and a large adjustable range of the rotation angle.

The support frame 50 can be operated to a desired position through one-key linkage control or an independent control by an intelligent controller, and a starting position, an intermediate point position and a terminal position can be set for a movement route of the support frame 50. The intermediate point position here refers to a commonly used position of any point between routes, rather than a midpoint position. In use, when the support frame 50 is needed to be adjusted, a rotation angle and a position of the support frame 50 can be adjusted by controlling a movement key via the remote control until reaching the desired position needed by the support frame 50. When the support frame 50 of the telescopic plate 100a, 100b of the present disclosure is installed with a display screen, a viewing direction of a viewer can be kept still to adjust the display screen by controlling the motor 31, which is very convenient to use and improves the viewer's comfort.

In an embodiment of the present disclosure, the motor 31 is an automatic tubular motor, which is not only small in size and large in tension, but also can be hidden and installed in a ceiling. The motor 31 can be controlled by the remote control or by a Bluetooth of a mobile phone so that the movement route of the motor 31 can be optionally set and stopped at any point of the movement route.

Preferably, a rotation angle of the telescopic sliding rail 12 rotating around the positioning bolt 111 is formed 0-100°. With a large rotation angle range, the telescopic sliding rail 12 can be rotated by remotely controlling the motor 31 to adjust an optimal position.

In an embodiment of the present disclosure, the telescopic plate 100a, 100b are mainly used in home and building decoration, such as bedrooms, lobbies and meeting rooms. Of course, the telescopic plate 100a, 100b of the present disclosure can also be used in passenger cars or transport cars.

Furthermore, the circulation structure 40 further includes a guiding wheel 43 fixed at a distal top end 11a of fixed sliding rail 11, a swing arm 45 and a sliding wheel 44 fixedly connected with the telescopic sliding rail 12 via the swing arm 45. The upper connection member 41 passes through the guiding wheel 43 and the sliding wheel 44 in turn and then fixed on the telescopic sliding rail 12, and the lower connection member 42 passes through sliding wheel 44 and then fixed on the telescopic sliding rail 12.

Furthermore, the double-groove wheel 21 includes a first recess receiving the upper connection member 41 therein, and a second recess formed adjacent to the first recess and receiving the lower connection member 42 therein. In an embodiment of the present disclosure, both the upper connection member 41 and the lower connection member 42 are wire ropes with high tensile strength and toughness, good softness and safe and reliable usage.

Figure 5:
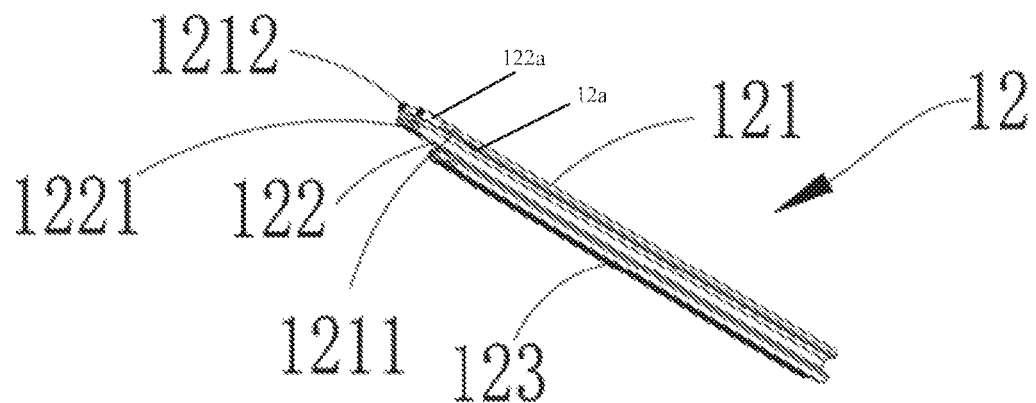
FIG. 5 is a schematic view of a telescopic sliding rail of the telescopic plate of the present disclosure.

Referring to FIG. 5, the telescopic sliding rail 12 includes a sliding portion 121, a connecting portion 122 and a mounting portion 123 all integrated with together. The sliding portion 121 can slide at a mouth end 11c of the fixed sliding rail 11, the mounting portion 123 is exposed outwardly and installed on the support frame 50, and the connecting portion 122 including a through-hole 1212 formed at a front portion 122a thereof to movably hinge with the swinging arm 45.

Preferably, a head of the connecting portion 122 is connected with a first idle wheel 1221, which can reduce resistance generated telescopic sliding rail 12 by the when the telescopic sliding rail 12 is slid.

Furthermore, the positioning groove 1211 is a U-shaped configuration and formed on a front bottom end of the sliding portion 121. A length of the mounting portion 123 is less than that of the connecting portion 122 so as to prevent the telescopic sliding rail 12 from interfering with the fixed sliding rail 11 during rotation of the telescopic sliding rail 12.

Figure 4:
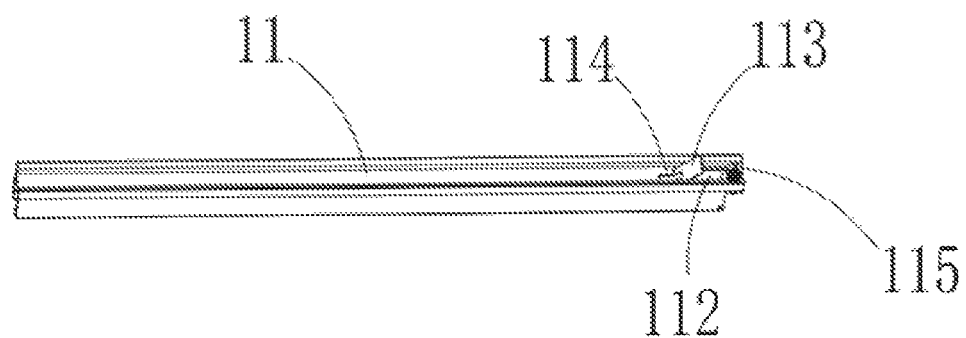
FIG. 4 is a schematic view of a fixed sliding rail of the telescopic plate of the present disclosure.

Referring to FIG. 4, the fixed sliding rail 11 further includes a square hole 112 formed on the distal top end 11a thereof for the front portion 12a of the telescopic sliding rail 12 passing therethrough during rotation of the telescopic sliding rail 12, a baffle 113 provided for resisting against the swinging arm 45 during indented rotation of the telescopic sliding rail 12, and a via-hole 114 connected with the square hole 112 and receiving the guiding wheel 43 therein, the upper connection member 41 passing through the via-hole 114 and the guiding wheel 43 and then entering into the fixed sliding rail 11.

Furthermore, the fixed sliding rail 11 includes a flipping member 115 formed on the distal top end 11a thereof, to balance vibration generated by the telescopic sliding rail 12, reduce noise during operation of the telescopic sliding rail 12. The flipping member 115 can resist against the telescopic sliding rail 12 during rotation of the telescopic sliding rail 12, so as to prevent the flipping member 115 from falling off the fixed sliding rail 11.

Preferably, a length from a connection between the telescopic sliding rail 12 and the swing arm 45 to the positioning bolt 111 is equal to a moment arm of the telescopic sliding rail 12 during its rotation, a torque formed by a tension force of the lower connection member 42 and the moment arm is configured to drive the telescopic sliding rail 12 to rotate and telescopically slide.

Figure 6:
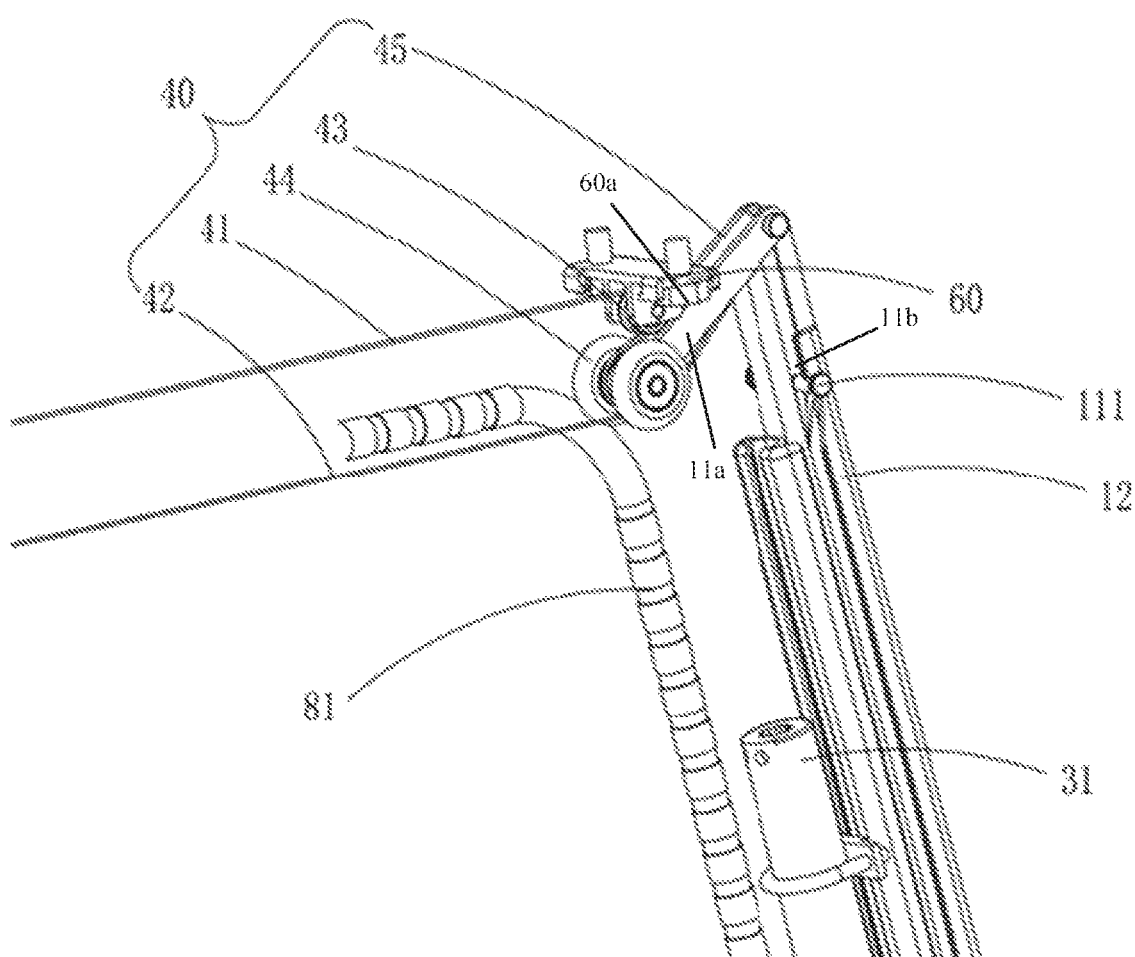
FIG. 6 is a partial schematic view of the telescopic plate without the fixed sliding rail of FIG. 1 of the present disclosure.
Figure 7:
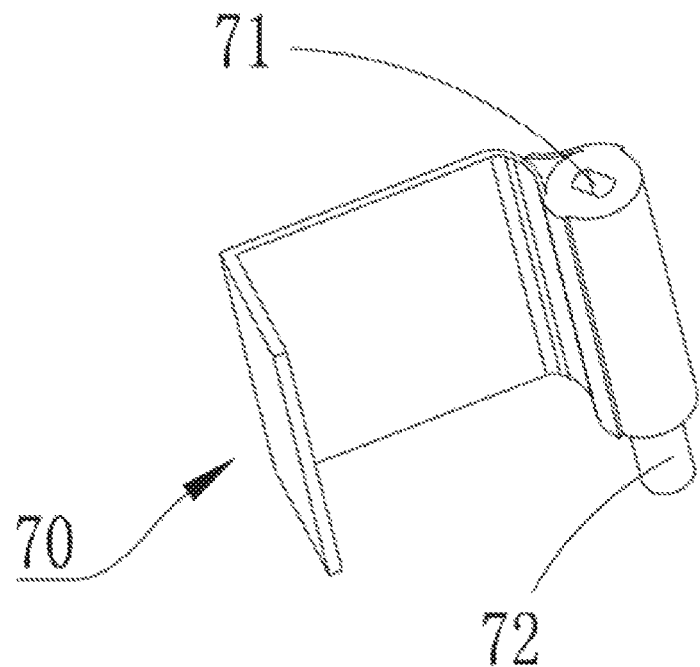
FIG. 7 is a schematic view of an arc support of the telescopic plate of the present disclosure.

Referring to FIG. 6, the telescopic plate 100a, 100b further includes at least one pair of fixing structures 60 for fixing with the fixed sliding rail 11, one of the pair of fixing structures 60 fixed at a front-top end 11d of the fixed sliding rail 11, the other of the pair of fixing structures 60 fixed at the distal top end 11a of the fixed sliding rail 11 and coaxial with the via-hole 114, the guiding wheel 43 passing through the via-hole 114 and fixed at a lower end 60a of the fixing structure 60.

Figure 2:
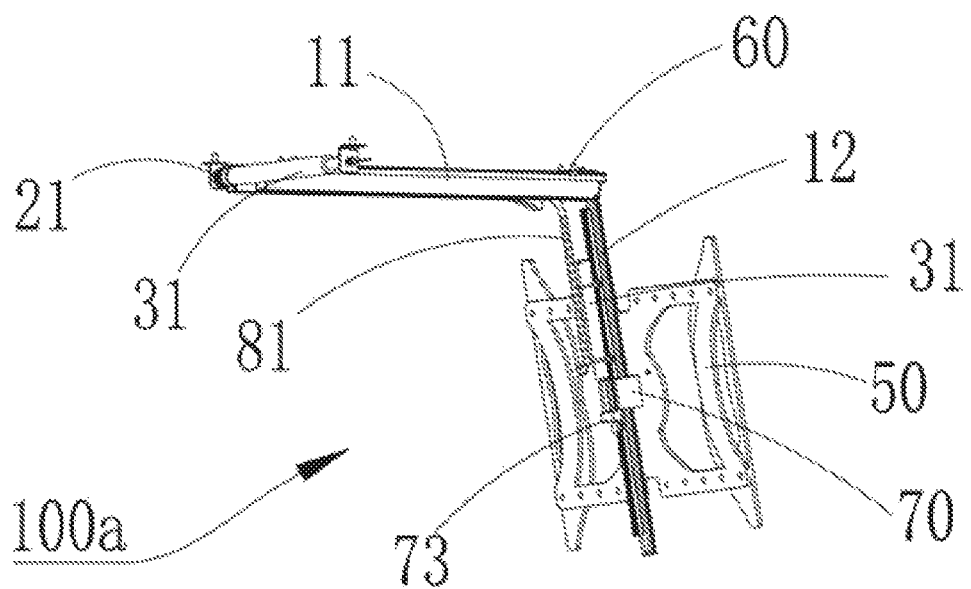
FIG. 2 is similar to FIG. 1, but shown from another view.

Referring to FIG. 1 and FIG. 2, a telescopic plate 100a according to a first embodiment of the present disclosure is arranged in the ceiling of a building or a passenger car. The fixed sliding rail 11 is fixedly installed in the ceiling, and the support frame 50 is installed with various display screens, video cameras and other devices and can be extended from the ceiling to rotate at an angle. The support frame 50 is provided for protruding from the ceiling during in usage, and can indent to hide in the ceiling during in non-usage so as to save a usage space of the telescopic plate 100a. Furthermore, the amount of each of the double-groove wheel 21, the fixed sliding rail 11 and the telescopic sliding rail 12 is one, and the amount of the motor 31 is two. The support frame 50 is movably connected with the telescopic sliding rail 12 via an arc support 70 which is fixedly connected with the motor 31, and the motor 31 is fixedly mounted on the mounting portion 123 to drive the arc support 70 to rotate around the telescopic sliding rail 12 so that the support frame 50 is driven to rotate around the telescopic sliding rail 12.

Preferably, a rotation angle of the support frame 50 rotating around the telescopic sliding rail 12 is formed 0-360°. When the telescopic sliding rail 12 is stretched out and completed its rotation, the motor 31 is remotely controlled to drive the support frame 50 to rotate around the telescopic sliding rail 12, so as to meet users to view the display screen from different directions and improve the convenience of use.

Furthermore, the arc support 70 includes a slotted hole 71 fixedly connected with a shaft head of the motor 31, a post 72 with and a bottom end thereof being connected with a hinge 73, and the hinge 73 fixedly connected with the mounting portion 123 by bolts.

Figure 8:
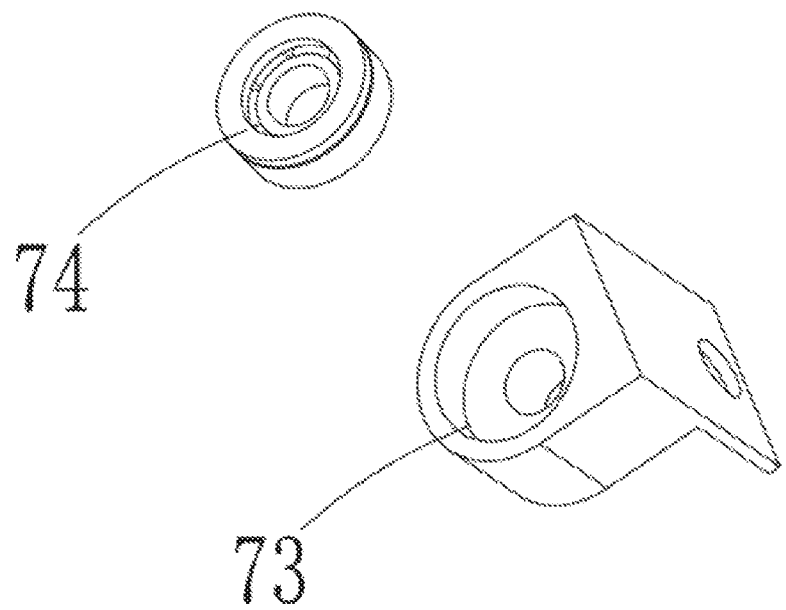
FIG. 8 is an exploded, schematic view of a thrust bearing and a hinge of the present disclosure.

Furthermore, referring to FIG. 8, the hinge 73 is connected with a thrust bearing 74 formed inside to reduce a friction force generated by the rotation of the support frame 50, and the motor 31 with a small torque can be selected.

Furthermore, the telescopic plate 100a further includes an elastic expansion hose of a power supply 81 used to receive power cords, network cords so as to prevent clutter of the telescopic plate 100a.

The telescopic plate 100a of the first embodiment of the present disclosure is arranged in the ceiling of a building or a passenger car, and the telescopic sliding rail 12 is hidden in the ceiling. When the telescopic plate 100a is non-used, the telescopic sliding rail 12 is parallelly installed on the fixed sliding rail 11 to save a space therebetween. When the telescopic plate 100a is needed, a first motor 31 can be controlled to work by a remote control, so as to control the double-groove wheel 21 to rotate along a first direction, so that the upper connection member 41 wound around the double-groove wheel 21 can pull the telescopic sliding rail 12 to slide out of the fixed sliding rail 11 and then stop a linear movement when the telescopic sliding rail 12 reaches a distal end of the fixed sliding rail 11. As the upper connection member 41 continues to pull the telescopic sliding rail 12 and under an action of gravity of the telescopic sliding rail 12 and the support frame 50, the positioning bolt 111 and the positioning groove 1211 are cooperated to make the telescopic sliding rail 12 rotate around the positioning bolt 111, thus driving the support frame 50 to extend and rotate outwardly. When the rotation is complete, a second motor 31 can be controlled by the remote control to drive the support frame 50 following with the arc support 70 to rotate around the telescopic sliding rail 12, with a rotation angle of 0-360°, which can view from different directions. When the telescopic plate 100a are finished to be used, the second motor 31 is controlled by the remote control to run to an original position, and then the first motor 31 is controlled to drive the double-groove wheel 21 to rotate along a second direction, so that the lower connection member 42 wound around the double-groove wheel 21 can pull the telescopic sliding rail 12 to slide inside the fixed sliding rail 11, thus driving the support frame 50 to retractably move back to its original position. Furthermore, the first direction is opposite to the second direction, for example, the first direction is clockwise and the second direction is counterclockwise.

Figure 3:
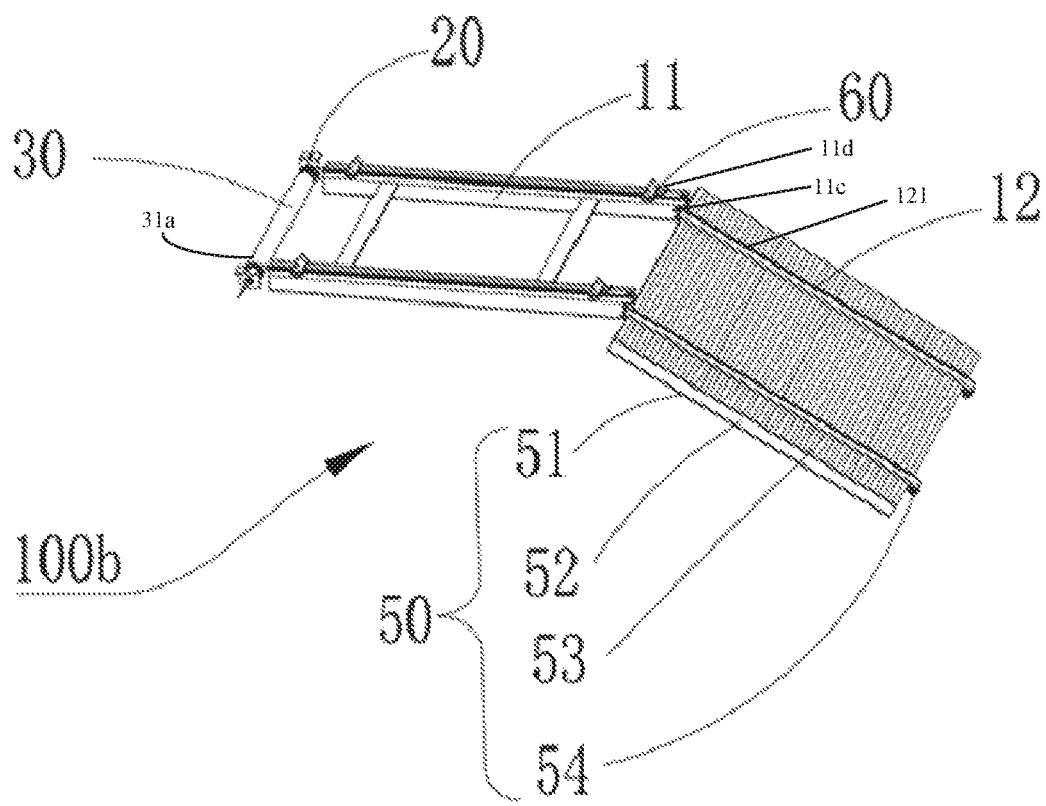
FIG. 3 is a schematic view of a telescopic plate in accordance with a second embodiment of the present disclosure.
Figure 9:
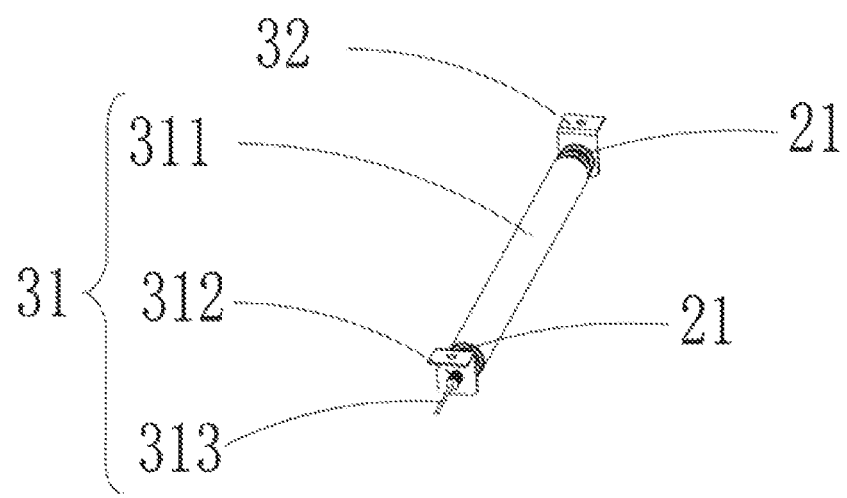
FIG. 9 is a partial enlarged schematic view of FIG. 3 of the present disclosure.

Referring to FIG. 3 and FIG. 9, a telescopic plate 100b of a second embodiment of the present disclosure is arranged in a passenger car to act as an expansion pedal, so as to conveniently get off for people. The supporting frame 50 is a pedal with a strong load-bearing capacity. Furthermore, amount of each of the double-groove wheel 21, the fixed sliding rail 11 and the telescopic sliding rail 12 is two, and the amount of the motor 1 is one. The two double-groove wheels 21 are installed on two ends of the motor 31, an extending direction of the two fixed sliding rails 11 is same and parallel to an extending direction of the two telescopic sliding rails 12, and the support frame 50 fixedly mounted on the two telescopic sliding rails 12.

Preferably, referring to FIG. 9, the motor 31 includes a driving sleeve tube 311, a hollow shafting tube 312 and a wire 313 passing through the hollow shafting tube 312 which is engaged with the double-groove wheel 21, and the motor 31 is fixed by a holder 32. One double-groove wheel 21 is mounted on an end of the motor 31, and the other double-groove wheel 21 is mounted on an opposite end of the motor 31 via the driving sleeve tube 311. Two ends of the driving sleeve tube 311 are connected with the double-groove wheel 21, which can reduce an effective diameter of the double-groove wheel 21 to increase the tension force of the upper and lower connection members 41, 42, thus the motor 31 with a small torque can be selected.

Furthermore, an elastic spring is wound around each of the first recess and the second recess of the double-groove wheel 21 in two opposite directions. An end of each elastic spring is fixedly connected with a corresponding end of the upper connection member 41 and the lower connection member 42, respectively, so that each non-stressed side of the upper connection member 41 and the lower connection member 42 is in an elastic tension state to run more smoothly.

Furthermore, referring to FIG. 3, the support frame 50 includes a supporting plate 51, an anti-skidding plate 53 and a lining plate 52 formed between the supporting plate 51 and the anti-skidding plate 53. The material of the lining plate 52 is made of high polymer to reduce a weight of the telescopic plate 100b, and the anti-skidding plate 53 can be made of aluminum alloy or stainless steel, etc.

Preferably, a pair of second idler wheels 54 is connected with a distal end of the telescopic sliding rail 12. When the telescopic sliding rail 12 rotates to a required position, the second idler wheel 54 can be contact with the ground, which can reduce the tension force of the upper connection member 41 and the lower connection member 42 to prevent the telescopic sliding rail 12 from being damaged due to direct contact between the telescopic sliding rail 12 and the ground.

Furthermore, a connecting rod is fixed between the two fixed sliding rails 11 to prevent the telescopic plate 100b from shaking during its operation.

The telescopic plate 100b of the second embodiment of the present disclosure is arranged in a bus or a passenger car to act as an expansion pedal, and the expansion sliding rail 12 is hidden in a chassis of the bus or the passenger car. When the telescopic plate 100b is non-used, the telescopic sliding rail 12 is parallelly installed on the fixed sliding rail 11 to save a space therebetween. When the telescopic plate 100b is needed, the motor 31 can be controlled to work by a remote control, so as to control the double-groove wheel 21 to rotate along a first direction, so that the upper connection member 41 wound around the double-groove wheel 21 can pull the telescopic sliding rail 12 to slide out of the fixed sliding rail 11 and then stop a linear movement when the telescopic sliding rail 12 reaches a distal end of the fixed sliding rail 11. As the upper connection member 41 continues to pull the telescopic sliding rail 12 and under an action of gravity of the telescopic sliding rail 12 and the support frame 50, the positioning bolt 111 and the positioning groove 1211 are cooperated to make the telescopic sliding rail 12 rotate around the positioning bolt 111, thus driving the support frame 50 to extend and rotate outwardly, with a rotation angle of 0-100°. The rotation angle can be remotely controlled according to a height of the passenger car from the ground so as to conveniently get off for people. Of course, a common rotation angle can be set through the intermediate route of the motor 31 to conveniently use of every time. When the telescopic plate 100b are finished to be used, the motor 31 can be controlled by the remote control to control the double-groove wheel 21 to rotate along a second direction, so that the lower connection member 42 wound around the double-groove wheel 21 can pull the telescopic sliding rail 12 to slide inside the fixed sliding rail 11, thus driving the support frame 50 to retractably move back to its original position. Furthermore, the first direction is opposite to the second direction, for example, the first direction is clockwise and the second direction is counter-clockwise.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A telescopic plate comprising:
    a sliding rail structure comprising at least one fixed sliding rail and at least one telescopic sliding rail sliding within the fixed sliding rail;
    a drive structure comprising at least one motor;
    a rotation structure comprising at least one double-groove wheel mounted on an end of the motor;
    a circulation structure comprising an upper connection member and a lower connection member, both the upper connection member and the lower connection member wound around the at least one double-groove wheel and extending into the fixed sliding rail to be fixedly connected with the telescopic sliding rail;
    a support frame mounted on the telescopic sliding rail;
    a positioning bolt formed on an inner wall at a tail end of the fixed sliding rail and a positioning groove formed at a front portion of the telescopic sliding rail to engage with the positioning bolt; and wherein
    the upper connection member and the lower connection member are provided for pulling the telescopic sliding rail to drive the support frame to slide in the fixed sliding rail; and the positioning bolt and the positioning groove are cooperatively engaged with each other so that the telescopic sliding rail can rotate relative to the positioning bolt so as to slide and rotate the support frame relative to the fixed sliding rail; and where in
    a rotation angle of the telescopic sliding rail rotating round the positioning bolt is formed 0-100°; and wherein
    the circulation structure further comprises a guiding wheel fixed at a distal top end of fixed sliding rail, a swing arm and a sliding wheel fixedly connected with the telescopic sliding rail via the swing arm, the upper connection member passing through the guiding wheel and the sliding wheel in turn and then fixed with the telescopic sliding rail, and the lower connection member passing through the sliding wheel and then fixed with the telescopic sliding rail.

2. The telescopic plate as claimed in claim 1, wherein the telescopic sliding rail comprises a sliding portion, a connecting portion and a mounting portion all integrated with together, the sliding portion sliding at a mouth end of the fixed sliding rail, the mounting portion exposed outwardly and installed on the support frame, and the connecting portion comprising a through-hole formed at a front portion thereof to movably hinge with the swinging arm.

3. The telescopic plate as claimed in claim 2, wherein the fixed sliding rail further comprises a square hole provided that the front portion of the telescopic sliding rail can pass therethrough during rotation of the telescopic sliding rail, a baffle provided for resisting against the swinging arm during indented rotation of the telescopic sliding rail, and a via-hole connected with the square hole and receiving the guiding wheel therein, the upper connection member passing through the via-hole and the guiding wheel and then entering into the fixed sliding rail.

4. The telescopic plate as claimed in claim 3, wherein the telescopic plate further comprises at least one pair of fixing structures fixed with the fixed sliding rail, one of the pair of fixing structures fixed at a front-top end of the fixed sliding rail, the other of the pair of fixing structures fixed at the distal top end of the fixed sliding rail and coaxial with the via-hole, the guiding wheel passing through the via-hole and fixed at a lower end of the fixing structure.

5. The telescopic plate as claimed in claim 4, wherein the amount of each of the double-groove wheel, the fixed sliding rail and the telescopic sliding rail is one, and the amount of the motor is two, the support frame movably connected with the telescopic sliding rail via an arc support which is fixedly connected with the motor, the motor fixedly mounted on the mounting portion to drive the arc support to rotate around the telescopic sliding rail so that the support frame is driven to rotate around the telescopic sliding rail.

6. The telescopic plate as claimed in claim 5, wherein a rotation angle of the support frame rotating around the telescopic sliding rail is formed 0-360°.

7. The telescopic plate as claimed in claim 4, wherein the amount of each of the double-groove wheel, the fixed sliding rail and the telescopic sliding rail is two, and the amount of the motor is one, the two double-groove wheels installed on two ends of the motor, an extending direction of the two fixed sliding rails same and parallel to an extending direction of the two telescopic sliding rails, the support frame fixedly mounted on the two telescopic sliding rails.

8. The telescopic plate as claimed in claim 7, wherein the support frame comprises a supporting plate, an anti-skidding plate and a lining plate formed between the supporting plate and the anti-skidding plate.

* * * * *